C. E. JENKINS.
POTATO MASHER.
APPLICATION FILED DEC. 1, 1919.
1,349,885.                                            Patented Aug. 17, 1920.
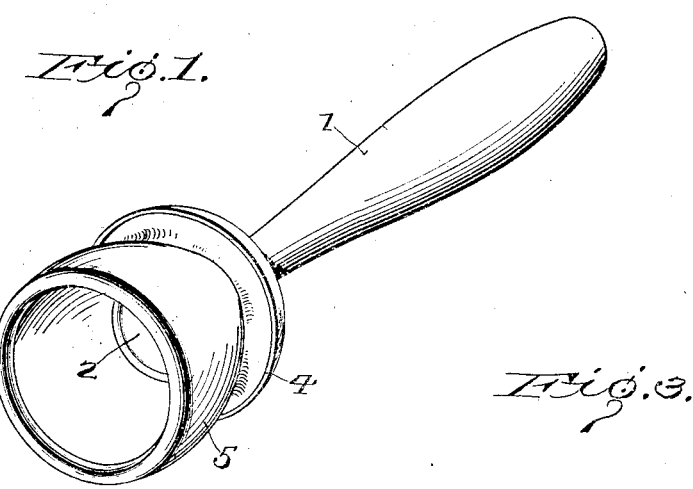
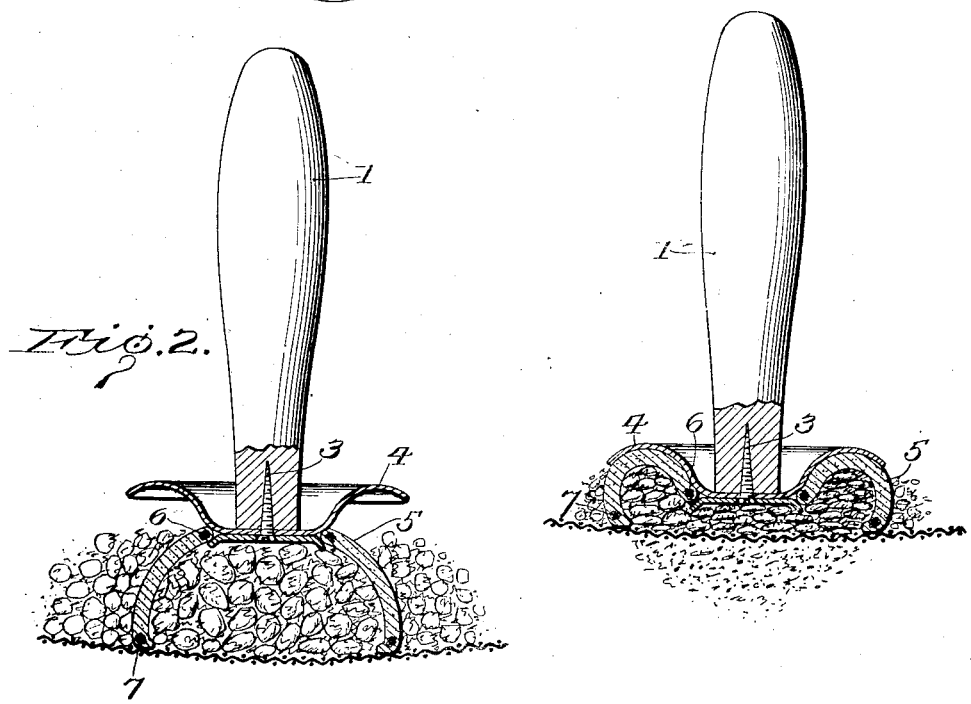
Witness
Helen W. Duvall.
Inventor
C. E. Jenkins
By
Sturtevant & Mason
Attorneys

UNITED STATES PATENT OFFICE.

CLARENCE E. JENKINS, OF KEENE, NEW HAMPSHIRE.

POTATO-MASHER.

1,349,885.

Specification of Letters Patent.

Patented Aug. 17, 1920.

Application filed December 1, 1919. Serial No. 341,766.

*To all whom it may concern:*

Be it known that I, CLARENCE E. JENKINS, a citizen of the United States, residing at Keene, in the county of Cheshire, State of New Hampshire, have invented certain new and useful Improvements in Potato-Mashers, of which the following is a description, reference being had to the accompanying drawing and to the figures of reference marked thereon.

This invention relates to food crushers, and more particularly to hand operated vegetable mashers.

The ordinary vegetable mashers, comprising a simple wooden handle formed with an enlarged mashing surface, are more or less ineffective for crushing substances in lump form because the lumps are scattered from under the flat surface of the masher during the crushing action. Furthermore, when such a device was used in connection with a colander or apertured utensil, the masher substance tends to clog the meshes or perforations in the utensil.

One of the objects of the present invention is to provide a vegetable masher with a crushing surface, and an associated means for confining the substance within the immediate region of the crushing element.

A further object of this invention is to provide a vegetable masher with a crushing element and an associated yieldable food retaining means for confining the substance within the crushing zone during the mashing action.

Still another object of this invention is to provide such a vegetable masher with a yieldable food retaining ring mounted pivotally on said crushing element so that said ring may be made to effectively yield under the crushing action of the implement.

Still another object of this invention is to provide a crushing element adapted to force food through the perforations of the utensil and to associate therewith means for creating a suction on the upper surface of said utensil after the crushing action to withdraw the food clogged in said perforations to keep the latter clean.

An additional object of the invention resides in providing a crushing element adapted to force food through the perforations of the utensil and associating therewith means for creating an air pressure on the upper surface of said food to assist in forcing the food through said perforations.

Still another object of this invention resides in providing a crushing element adapted to crush and force food through perforations of a utensil with an associated airtight means for creating successively a pressure and a suction on the upper surface of said utensil.

These and other objects will in part be obvious and will in part be hereinafter more fully disclosed.

In the drawings, which show by way of illustration one embodiment of the invention:—

Figure 1 illustrates a perspective view of one form of my invention,

Fig. 2 is a sectional view of one form of the invention operating upon a wire mesh container and preparatory to the crushing action, and Fig. 3 is a similar view during the crushing action and showing the deformation of the yieldable retaining ring.

In general, the invention embraces a handle of any desired form provided at its inner end with a rigid crushing surface to which, or to the handle, is mounted a yieldable food retaining means in the form of an open ended ring or member of any desired shape provided that the connection between it and the mashing surface is substantially airtight.

Referring more particularly to the accompanying drawings, the vegetable masher comprises a handle 1 of wood or any suitable material, terminating in a crushing surface or provided with a crushing element in the form of a metallic facing 2. This facing 2 is attached to the handle in any desired manner as by means of the screw 3 and retains between it and the end of the handle, a guard or backing member 4, preferably also of metal. Pivotally mounted in any desired manner between the facing strip 2 and this guard 4 is the food confining or retaining means, preferably in the shape of a yieldable rubber or other composition ring 5. This ring, if desired, may be annularly reinforced to retain and preserve its form at its open ends as at 6 and 7 by cords, wire or other means embedded therein. The reinforcing means 7 at the outer end in particular preserves the shape of the rubber mouth and prevents it from unduly stretching, while the guard limits the extreme backward position of the food retaining member and prevents it from being turned inside out.

It will be apparent that various ways and means for mounting this ring on the mashing element may be availed of. For instance, the masher may terminate in a broad crushing surface and the yieldable ring pivotally mounted in the annular recesses in the sides of said crushing surface and held in place by any desired means. Furthermore, the yieldable ring may assume various shapes or take the form of an ordinary suction cup connected to the end of a mashing surface and attached to the enlarged end of the handle in any desired manner, which handle end will operate as a rigid crushing surface. The retaining member might be slidably mounted on the masher and adapted to yield after the mashing stroke. It is also evident that the ring may be used with or without the guard 4.

Referring more particularly to Figs. 3 and 4, it will be seen that when the device is used to crush or force food through a perforated utensil, such as a colander or wire mesh receptacle, on the downward stroke of the masher, the food will be confined within the yieldable food retaining ring and due to the downward movement of the rigid crushing element, will be crushed and forced through the perforations or meshes of the utensil and it will be evident that this food will completely fill such perforations so that the air entrapped above the food within the retaining means or ring will create a pressure upon the upper surface of the food and receptacle, tending to force the substance through the perforations therein. It will also be evident that on the reverse stroke of the instrument, that is, when it is withdrawn from the surface of the receptacle, the suction created within the retaining ring, due to its withdrawal, will operate to suck out such food or substance remaining in and clogging the perforations or meshes in the utensil or colander, so that these perforations will be automatically cleaned. The yieldable member acts not only as a food retaining ring but the open end thereof assists in scraping the food through the perforations or meshes, since its yieldable nature readily adapts itself to the depressions therein.

It is obvious that minor changes in the details of construction may be made without departing from the spirit of the invention as set forth in the appended claims.

Having thus fully described the invention, what I claim as new and desire to secure by Letters-Patent, is:—

1. A vegetable masher comprising a crushing element and yieldable means carried by said masher for confining the substance within the immediate region of the crushing element.

2. A vegetable masher comprising a crushing element, and a yieldable food retaining ring connected to said element.

3. A vegetable masher comprising a crushing element, and a yieldable food retaining ring pivotally connected to said element.

4. A vegetable masher comprising a crushing element, and a yieldable food retaining ring pivotaly connected to said element and means on said masher for preventing undue yielding of said ring.

5. A vegetable masher comprising a crushing element adapted to force food through the perforations of a utensil, means associated with said masher for creating a suction on the upper surface of said utensil after the crushing action to withdraw the food clogged in said perforations.

6. A vegetable masher comprising a member adapted to crush and force food through the perforations of a utensil, means associated with said member for creating an air pressure on the upper surface of said food to assist in forcing the food through said perforations.

7. A vegetable masher comprising a member adapted to crush and force food through the perforations of a utensil, and means associated therewith for creating successively a pressure and a suction on the upper surface of said utensil.

In testimony whereof I affix my signature.

CLARENCE E. JENKINS.